US011973337B2

(12) United States Patent
Zhu et al.

(10) Patent No.: US 11,973,337 B2
(45) Date of Patent: Apr. 30, 2024

(54) FERROMAGNETIC HARMONIC ELIMINATION METHOD FOR ACTIVE MATCHED RESISTANCE VOLTAGE TRANSFORMER BASED ON PID ADJUSTMENT

(71) Applicant: Qujing Power Supply Bureau of Yunnan Power Grid Co., Ltd, Qujing (CN)

(72) Inventors: Xiaohong Zhu, Qujing (CN); Lianjing Yang, Qujing (CN); Fei Mao, Qujing (CN); Rong Zhang, Qujing (CN); Yang Yang, Qujing (CN); Jiangyun Su, Qujing (CN); Wenfei Feng, Qujing (CN); Zhe Li, Qujing (CN); Pengjin Qiu, Qujing (CN); Jianbin Li, Qujing (CN); Zhikun Hong, Qujing (CN); Weirong Yang, Qujing (CN); Changjiu Zhou, Qujing (CN); Yingqiong Zhang, Qujing (CN); Rui Xu, Qujing (CN); Guibing Duan, Qujing (CN)

(73) Assignee: Qujing Power Supply Bureau of Yunnan Power Grid Co., Ltd, Qujing (CN)

( * ) Notice: Subject to any disclaimer, the term of this patent is extended or adjusted under 35 U.S.C. 154(b) by 0 days.

(21) Appl. No.: 18/451,669

(22) Filed: Aug. 17, 2023

(65) Prior Publication Data
US 2024/0072531 A1 Feb. 29, 2024

(30) Foreign Application Priority Data
Aug. 19, 2022 (CN) .......................... 202210996221.3

(51) Int. Cl.
*H02H 7/05* (2006.01)
*G05B 11/42* (2006.01)
(Continued)

(52) U.S. Cl.
CPC ............... *H02H 7/05* (2013.01); *G05B 11/42* (2013.01); *H01F 27/343* (2013.01); *H02J 3/01* (2013.01); *G06F 17/16* (2013.01); *H02J 2203/20* (2020.01)

(58) Field of Classification Search
CPC ......... H02H 7/05; G05B 11/42; H01F 27/343; H02J 3/01; H02J 2203/20
See application file for complete search history.

(56) References Cited

U.S. PATENT DOCUMENTS 3,401,272 A * 9/1968 Rosa ........................ H03K 3/49
361/111
3,624,499 A * 11/1971 Smith ..................... G01R 29/18
324/108

(Continued)

*Primary Examiner* — Scott Bauer
(74) *Attorney, Agent, or Firm* — IDEA Intellectual Limited; Margaret A. Burke; Sam T. Yip

(57) ABSTRACT

This invention relates to the technical field of harmonic elimination for ferromagnetic resonance for a voltage transformer (abbreviated as PT), in particular, to a harmonic elimination method for ferromagnetic resonance for an active resistance-matching voltage transformer based on PID-adjustment, including compiling a resistance matching algorithm; designing and building a harmonic elimination control system based on the PID control strategy; presetting an active resistance-matching strategy; designing an engineering scheme for placing resistors. The present invention can solve the contradiction between the standards of the harmonic elimination resistance and the winding overload in the open triangle of the voltage transformer when the single-phase ground fault occurs and the fault is eliminated; avoiding the technical difficulties that the characteristics of single-phase ground fault and power frequency resonance are difficult to distinguish and the ferromagnetic resonance caused by single-phase ground fault; ensuring that the voltage transformer PT is not overloaded and burned.

6 Claims, 6 Drawing Sheets

(51) Int. Cl.
  *H01F 27/34* (2006.01)
  *H02J 3/01* (2006.01)
  *G06F 17/16* (2006.01)

(56) References Cited

U.S. PATENT DOCUMENTS

| | | | | |
|---|---|---|---|---|
| 3,666,991 | A * | 5/1972 | Wolf | H02H 9/007 |
| | | | | 338/57 |
| 5,375,053 | A * | 12/1994 | Jarvik | H02M 7/08 |
| | | | | 363/126 |
| 7,558,032 | B2 * | 7/2009 | Piasecki | H02H 9/007 |
| | | | | 361/37 |
| 9,246,326 | B2 * | 1/2016 | Dong | G06N 5/048 |
| 10,374,427 | B2 * | 8/2019 | Xu | H02H 9/08 |
| 2020/0287379 | A1 * | 9/2020 | Wang | H02H 9/007 |

* cited by examiner

|  |  | Line voltage | Phase voltage | Open triangle voltage $3U_0$ or $U_r$ |
|---|---|---|---|---|
| Single phase grounding | Metallic ground | value, direction, symmetry unchanged | The phase voltage of the ground phase is 0, and the other two phases rise to the line voltage | 100V |
|  | Non-metallic grounding |  | The three-phase voltage varies with the grounding resistance and the capacitance of the system to the ground, and the effective values of the three phases are different | Less than 100V |
| Voltage transformer Ferromagnetic resonance | Power frequency ferromagnetic resonance |  | The value of one phase or two phases increases the same and exceeds the line voltage; the voltage value of the other two phases or one phase decreases | Single-phase rise to be less than 100V and greater than 50V, two-phases rise to be greater than 100V |
|  | division frequency ferromagnetic resonance |  | The three-phase voltage rises at the same time and swings at the same time | There is zero-sequence voltage, and value is variable |
|  | High harmonic ferromagnetic resonance |  | Three-phase voltage rises at the same time |  |

FIG. 3

FERROMAGNETIC HARMONIC ELIMINATION METHOD FOR ACTIVE MATCHED RESISTANCE VOLTAGE TRANSFORMER BASED ON PID ADJUSTMENT

TECHNICAL FIELD

The invention relates to the technical field of harmonic elimination for ferromagnetic resonance for a voltage transformer (abbreviated as PT), in particular, to a harmonic elimination method for ferromagnetic resonance for an active resistance-matching voltage transformer based on PID-adjustment.

BACKGROUND

The root cause of the resonance is attributed to the nonlinearity of the iron core within the voltage transformer. The electromagnetic voltage transformer can be thought of as an inductive component featuring an iron core. Due to the nonlinearity of this iron core, disturbances in the system lead to fluctuations in the excitation current, consequently altering the inductance value of the transformer. When the inductance L and the capacitor C of the circuit satisfies $\omega L=1/\omega C$, resonance occurs. Herein, $\omega$ may be the fundamental angular frequency of the power grid, or it may be the harmonic angular frequency. Therefore, when the harmonic content is large, the possibility of resonance increases.

A voltage transformer with an open triangle is shown in FIG. 1. If the voltage transformer resonates, it is easy to cause an overload of a certain phase and damage the voltage transformer. In principle, the technical measures to prevent and eliminate voltage transformer resonance can be divided into two categories, namely including: changing the resonance circuit parameters and damping resonance. In this regard, changing the parameters of the resonant circuit means changing the parameters of the inductance or capacitance in the resonant circuit, thereby destroying the resonance condition and achieving the purpose of eliminating the resonance. The method for damping resonance is to increase the system damping, that is, to connect a resistor with a proper standard in series at the opening of the open triangle, so as to consume resonance energy, thereby achieving the purpose of suppressing or eliminating resonance. So far, most of the harmonic elimination products use the damping resonance method. During the harmonic elimination process of the voltage transformer, when resonance occurs, a resistor with light resistance is put in so as to realize the series connection, or the opening is shorted. When the system is in normal operation, the open triangle voltage is 0V, and thus the damping resistor connected in parallel will not affect the normal operation. When the line voltage asymmetry occurs, such as single-phase short-circuit grounding, disconnection or other faults, the neutral point will be displaced, making the three-phase voltage asymmetrical, which will lead to an increase in the open triangle voltage, saturation of the voltage transformer core, and zero-sequence magnetic flux, the zero-sequence current flows through the high-voltage winding, and the zero-sequence voltage will be induced at both ends of the opening terminals. It will cause that the zero-sequence current flows through the damping resistor connected in parallel and then consume resonance energy, which limits and destroys ferromagnetic resonance. Also, the greater the secondary zero sequence current, the greater the suppression effect, and the best effect occurs when short-circuited. However, long-term short-circuiting can easily lead to overload of the voltage transformer and burn the transformer. The smaller the resistance invested in eliminating resonance, the better the effect of eliminating resonance. The disadvantage is that it is easy to cause saturation of the iron core, thereby overloading a certain phase winding of the voltage transformer, and in severe cases, destroying the voltage transformer as well.

At present, the method for eliminate resonance on voltage transformers is mainly the method of microprocessor harmonic elimination, and there are also a few methods for active harmonic elimination. According to the frequency at which the resonance occurs, the resonance of the voltage transformer includes power-frequency resonance, high-frequency resonance, and frequency-division resonance. Considering that the frequency of high-frequency resonance and frequency-division resonance is different from the power-frequency of 50 Hz, it is easy to achieve the effect of harmonic elimination for high-frequency resonance and frequency-division resonance by using the microprocessor harmonic elimination to eliminate resonance. For power-frequency resonance, considering that there is a power frequency voltage at the opening of the open triangle and that the characteristics of power-frequency resonance are basically the same as those of single-phase ground faults, there is no way to achieve the purpose of harmonic elimination by using the of microprocessor harmonic elimination. The extremely difficult situation is: the voltage at the opening of the open triangle is less than 100V. If a single-phase grounding occurs, due to the put harmonic elimination resistance or the opening short-circuited during the harmonic elimination, it will overload the open triangle winding and cause the iron core to saturate, thereby forming a new voltage mutual inductance resonance phenomenon. If the active harmonic elimination method is adopted, this contradiction can be well resolved.

Active harmonic elimination is an adjustment method for automatic tracking of the harmonic elimination resistance of voltage transformers, which can solve the contradiction between the standards of the harmonic elimination resistance and the winding overload in the open triangle of the voltage transformer when the single phase is grounded. Also, it can solve the difficult problem that single-phase ground fault and power frequency resonance characteristics are difficult to distinguish, and can deal with power frequency resonance. However, in related products, the resistance value of the resistance box used for harmonic elimination is discrete, and the relatively large jumping occurs during the harmonic elimination process, which leads to obvious hysteresis effect is and thus greatly reduces the effect of real-time tracking. In view of this, the proposed is a harmonic elimination method for ferromagnetic resonance for an active resistance-matching voltage transformer based on PID-adjustment.

SUMMARY OF INVENTION

The purpose of the present invention is to provide a harmonic elimination method for ferromagnetic resonance for an active resistance-matching voltage transformer based on PID-adjustment, so as to solve the problems raised in the above-mentioned background.

In order to realize the solution of the above-mentioned technical problems, one of the purposes of the present invention is to provide a provide a harmonic elimination method for ferromagnetic resonance for an active resistance-matching voltage transformer based on PID-adjustment, including the following steps:

S1, compiling a resistance matching algorithm: analysing voltage amplitude and phase sequence of a voltage transformer in different situations of a power grid system, so as to obtain corresponding resistance matching algorithms, respectively;

S2, designing and building a harmonic elimination control system based on the PID control strategy;

S3, using the above-mentioned harmonic elimination control system, according to different conditions of voltage, presetting an active resistance-matching strategy, and executing the strategy to realize dynamic adjustment of harmonic elimination matching resistance;

S4, designing an engineering scheme for placing resistors in order to avoid ferromagnetic resonance when a system failure is recovered.

As a further improvement of the present technical solution, in the above-mentioned step of S1, the different situations of the voltage transformer in the power grid system include but not limited to: normal situation, single-phase metal grounding of the system, non-metallic grounding, unbalanced three-phase in the system, and the likes.

the above step of S1, the analysing the voltage amplitude and the phase sequence of the voltage transformer in the different situations of the power grid system, so as to obtain corresponding resistance matching algorithms, respectively As a further improvement of the present technical solution, in the above-mentioned step of S1, the specific methods for analysing the voltage amplitude and the phase sequence of the voltage transformer in the different situations of the power grid system so as to obtain the corresponding resistance matching algorithms, respectively, include:

Firstly, it is assumed that an effective value of a port voltage of an open triangle winding that can be directly measured from the opening is $U_r$, in which its phasor is expressed as $\dot{U}_r$ and the phase sequence of the three-phase winding of the open triangle is expressed as a*, b* and c*, used to distinguish PT primary side and secondary side voltage phase sequence to facilitate vector analysis;

in which, the neutral point is 0; also, $U_{a*}=U_{b*}=U_{c*}=100V/3$ is the effective value of the open triangle three-phase voltage under normal operation, where the phasor representation corresponds to $\dot{U}_{a*}$, $\dot{U}_{b*}$ and $\dot{U}_{c*}$; $U_o=U_r/3$ is the effective value of neutral point-to-ground voltage, called zero-sequence voltage, and with the phasor represents $$\dot{U}_o; \theta = \arccos\frac{U_r}{100}$$

is the angle of the zero sequence voltage and the phase voltage of the open triangle corresponding to grounding;

Then, there are further conditions.

When the system has a single-phase ground fault, at this time, it is very similar to the characteristics of the power-frequency resonance;

under a normal situation, there is no voltage across the opening of the open triangle, that is, $\dot{U}_r=\dot{U}_{a*}+\dot{U}_{b*}+\dot{U}_{c*}=0V$;

when the single-phase metal of the system is grounded, there is no voltage on a certain phase of the primary winding of the voltage transformer, resulting in no voltage on the corresponding phase of the corresponding PT secondary winding, and a 100V voltage appears on the open triangle, that is, $U_r=100V$;

when the non-metal is grounded, it is assumed that among the three phases of the open triangle, the effective value of the a* phase voltage is $U_{a*}'$ which is the largest, and its apparent power is also the largest, so the a* phase is the easiest overloaded; if the a* phase is guaranteed not to be overloaded, the other two phases must not be overloaded.

As a further improvement of the present technical solution, when non-metal is grounded, $U_{a*}'$ can be calculated by using vector calculation combined with geometric principles, the equation is as follows:

$$U_{a*}' = \sqrt{U_o^2 + U_{a*}^2 - 2U_oU_{a*}\cos\left(120 + \arccos\frac{U_r}{100}\right)}; \quad (1)$$

considering $U_r=3U_o$, and $U_{a*}=100V/3$, there is:

$$U_{a*}' = \frac{1}{3}\sqrt{U_r^2 + 100^2 - 200U_r\cos\left(120 + \arccos\frac{U_r}{100}\right)}; \quad (2)$$

furthermore, the resistance for the harmonic elimination is $R_x$, and the open triangle current is $I_r$; then $I_r=U_r/R_x$; S is the rated power of each phase winding of the open triangle, and $U_m$ is the maximum value of the phase voltage in the three phases of the three windings of the open triangle;

taking $U_{IIm}$ as the maximum phase voltage of the secondary winding of the voltage transformer, according to the relationship of the winding ratio, it can be obtained that: $U_{IIM}=\sqrt{3}U_m$;

in the open triangle, under the premise of not exceeding the overload, according to the power relationship, it can be obtained:

$U_mI_r \leq KS$ or $U_mU_r/R_x \leq KS$;

that is:

$$R_x \geq \frac{U_mU_r}{KS}; \quad (3)$$

considering that when a* phase voltage is the largest, at this time, $U_m=U_{a*}'$, and combined with equation (2), it can be obtained:

$$R_x \geq \frac{U_r}{3KS}\sqrt{U_r^2 + 100^2 - 200U_r\cos\left(120 + \arccos\frac{U_r}{100}\right)}; \quad (4)$$

in the equation, K is the multiple ratio used for designing the excitation characteristics of the voltage transformer according to the phase rated voltage.

As a further improvement of the present technical solution, in the above-mentioned step of S1, in the process of compiling the resistance matching algorithm, the cancellation of a grounding fault is also a way for exciting ferromagnetic resonance, but there must be a transition process in the middle from grounding to resonance; during this transition process, the voltage changes significantly. When the voltage change in the transition process is detected, the input of the harmonic elimination resistance must be corrected for matching before being input again; therefore, when the three-phase system is unbalanced, the system neutral point is drifting, and the open triangle has power-frequency voltage. In actual operation, the voltage generally does not exceed 15V;

then, in the state where $U_r$ is less than or equal to 15V, considering the possibility of three-phase imbalance in the system, the active harmonic elimination matching resistance needs to ensure that the three-phase winding of the open triangle is absolutely not overloaded; at this time, the condition of no overload is estimated based on the relationship between the three-phase unbalance of the system;

according to the actual grid system operation result in $U_r \leq 15V$, the maximum phase voltage on the secondary winding side of the corresponding voltage transformer is:

$$U_{IIm} = \frac{\sqrt{3}}{3}(U_r + 100); \quad (5)$$

therefore, when the three-phase system is unbalanced, the value of the harmonic elimination resistance $R_x$ actively input is the minimum value $R_{x15}$, which is determined by:

$$R_{x15} = \frac{U_r(U_r + 100)}{3KS}. \quad (6)$$

As a further improvement of the present technical solution, in the above-mentioned step of S1, the basic prerequisite for compiling the resistance matching algorithm is: two-phase or three-phase short circuit is generally quickly removed by a microcomputer protection device in the operating system within 500 ms, so the open triangle matching resistors with any resistance value does not cause overload damage to the voltage transformer within 500 ms.

As a further improvement of the present technical solution, in the above-mentioned step of S2, based on the PID control strategy, the specific method for designing and constructing the harmonic elimination control system includes:

first, on the basis of active harmonic elimination, the PID control strategy is adopted, and further, according to the engineering characteristics of controlling resistance, the PI control is selected, that is, the proportional control algorithm and the integral control algorithm in the PID controller are used;

furthermore, the PID automatically adjusts the harmonic elimination resistance to run online for continuous operation throughout the entire duration, and gradually puts the harmonic elimination resistance into use through the proportional control algorithm. At the same time, the PID controls and eliminates the steady-state error in the proportional control algorithm through the integral control algorithm, so that the resonance of the voltage transformer approaches the minimum setting target value or almost none, which means preventing ferromagnetic resonance of the voltage transformer is in an active way;

at the same time, the data that needs to be detected or collected in real time during operation includes but is not limited to: voltage of the open triangle of the voltage transformer, phase voltage of three-phase of the open triangle of the voltage transformer, and loop current of the open triangle;

finally, the harmonic elimination control system is designed to track the change of the effective value $U_r$ of the open triangle port voltage in real time according to the cycle of 100 ms, so as to realize the dynamic adjustment of the harmonic elimination matching resistance.

As a further improvement of the present technical solution, in the above-mentioned step of S3, the presetting the active resistance-matching strategy includes:

first of all, by detecting the open voltage $U_r$, if $U_r$ is 0V, the three-phase grid system is balanced, and the resistance value of the matching input at this time has no effect on the open triangle; however, considering the actual operation of the grid, it is difficult to avoid the three-phase unbalanced situation, and then the input matching resistance value is calculated according to equation (6), taking $U_r=5V$ for calculation, that is, the input resistance value is $$R_{x5} = \frac{U_r(U_r + 100)}{3KS}.$$

As a further improvement of the present technical solution, in the above-mentioned step of S3, if $U_r$ changes, adjustment is performed according to the following strategies:

Strategy 1:
when $U_r$ is less than or equal to 15V, first, it is determined if the factor of $U_r$ change is caused by any one of load imbalance, single-phase ground fault, high-order harmonic in ferromagnetic resonance, and frequency division ferromagnetic resonance, and then through the harmonic elimination control system according to equation (6), dynamic calculation is performed until the fault is eliminated or the resonance energy disappears;

Strategy 2:
when $U_r$ is greater than 15V and less than or equal to 100V, first, it is determined if $U_r$ change is caused by ferromagnetic resonance or various faults represented by single-phase non-metallic grounding, and then using the harmonic elimination control system according to the equation (4), dynamically calculation is performed for the resistance value of the matching resistor until the fault is eliminated or the resonance energy disappears; after the resonance energy is released, or after the fault is eliminated, when $U_r$ is less than or equal to 15V, it can be handled according to strategy 1;

Strategy 3:
when $U_r$ is greater than 100V, first, the matching the resonant resistor is performed with twice the resistance of $R_{x100}$ through the resonance elimination control system, and, at the same time, the resonance elimination control system dynamically tracks the value of $U_r$. With the release of resonance energy, the value of $U_r$ can eventually be less than 100V, then going to the strategy 2.

As a further improvement of the present technical solution, in the above-mentioned step of S4, the engineering scheme for placing resistors mainly includes:

the input resistor is achieved by choosing an adjustable sliding rheostat with a high-power load porcelain disc. At the same time, the actuator can adopt a DC brushed geared motor, in which its power only needs to meet the driving requirements.

The second object of the present invention is to provide a method operating platform device, including a processor, a memory, a computer program stored in the memory and running on the processor, and an external PID controller. The processor is configured to execute the computer program, realizing the steps of the above-mentioned harmonic elimination method for ferromagnetic resonance for an active resistance-matching voltage transformer based on PID-adjustment.

The third object of the present invention is to provide a computer-readable storage medium. The computer-readable storage medium stores a computer program. When the computer program is executed by a processor, it realizes the steps of the above-mentioned harmonic elimination method for ferromagnetic resonance for an active resistance-matching voltage transformer based on PID-adjustment.

As compared with prior art, the beneficial effect of the present invention includes:

1. in the harmonic elimination method for ferromagnetic resonance for an active resistance-matching voltage transformer based on PID-adjustment, it can solve the contradiction between the standards of the harmonic elimination resistance and the winding overload in the open triangle of the voltage transformer when the single-phase ground fault occurs and the fault is eliminated; and it can well avoid the technical difficulties that the characteristics of single-phase ground fault and power frequency resonance are difficult to distinguish and the ferromagnetic resonance caused by single-phase ground fault;
2. in the harmonic elimination method for ferromagnetic resonance for an active resistance-matching voltage transformer based on PID-adjustment, the actual implementation strategy is to put in the corresponding resistance around the voltage transformer PT not being overloaded, which can ensure that the voltage transformer PT is not overloaded and burned; and the PID process only needs to pay attention to the voltage and current on the open triangle winding, and then, based on this requirement, a more intelligent harmonic elimination method can be adopted. That is, the rated power of the PT is used as the target value of the PID, and the resistance value of the input is dynamically adjusted to adjust the winding current of the open triangle. As such, the open triangle winding is not overloaded, and the purpose of harmonic elimination can be achieved at the fastest speed.

BRIEF DESCRIPTION OF DRAWINGS

FIG. 3 is an exemplary comparison table graph for a single-phase ground fault and ferromagnetic resonance of a voltage transformer according to the present invention;

DETAILED DESCRIPTION OF THE INVENTION

The following will clearly and completely describe the technical solutions in the embodiments of the present invention with reference to the accompanying drawings in the embodiments of the present invention. Obviously, the described embodiments are only some, not all, embodiments of the present invention. Based on the embodiments of the present invention, all other embodiments obtained by persons of ordinary skill in the art without making creative efforts belong to the protection scope of the present invention.

Embodiment 1

As shown in FIGS. 1 to 6, the present embodiment is to provide a harmonic elimination method for ferromagnetic resonance for an active resistance-matching voltage transformer based on PID-adjustment, including steps as follows:

S1, compiling a resistance matching algorithm: analysing voltage amplitude and phase sequence of a voltage transformer in different situations of a power grid system, so as to obtain corresponding resistance matching algorithms, respectively;

S2, designing and building a harmonic elimination control system based on the PID control strategy;

S3, using the above-mentioned harmonic elimination control system, according to different conditions of voltage, presetting an active resistance-matching strategy, and executing the strategy to realize dynamic adjustment of harmonic elimination matching resistance;

S4, designing an engineering scheme for placing resistors in order to avoid ferromagnetic resonance when a system failure is recovered.

Figure 1:
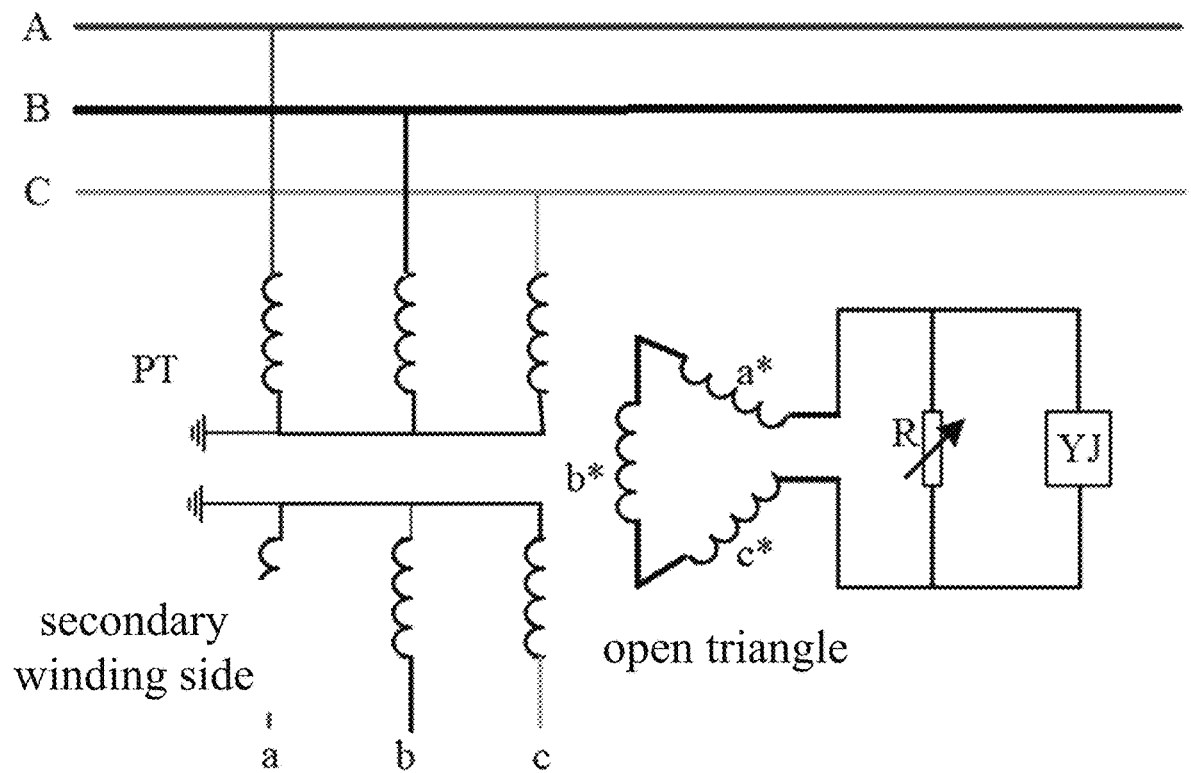
FIG. 1 is an exemplary voltage transformer circuit diagram with an open triangle according to the present invention.
Figure 2:
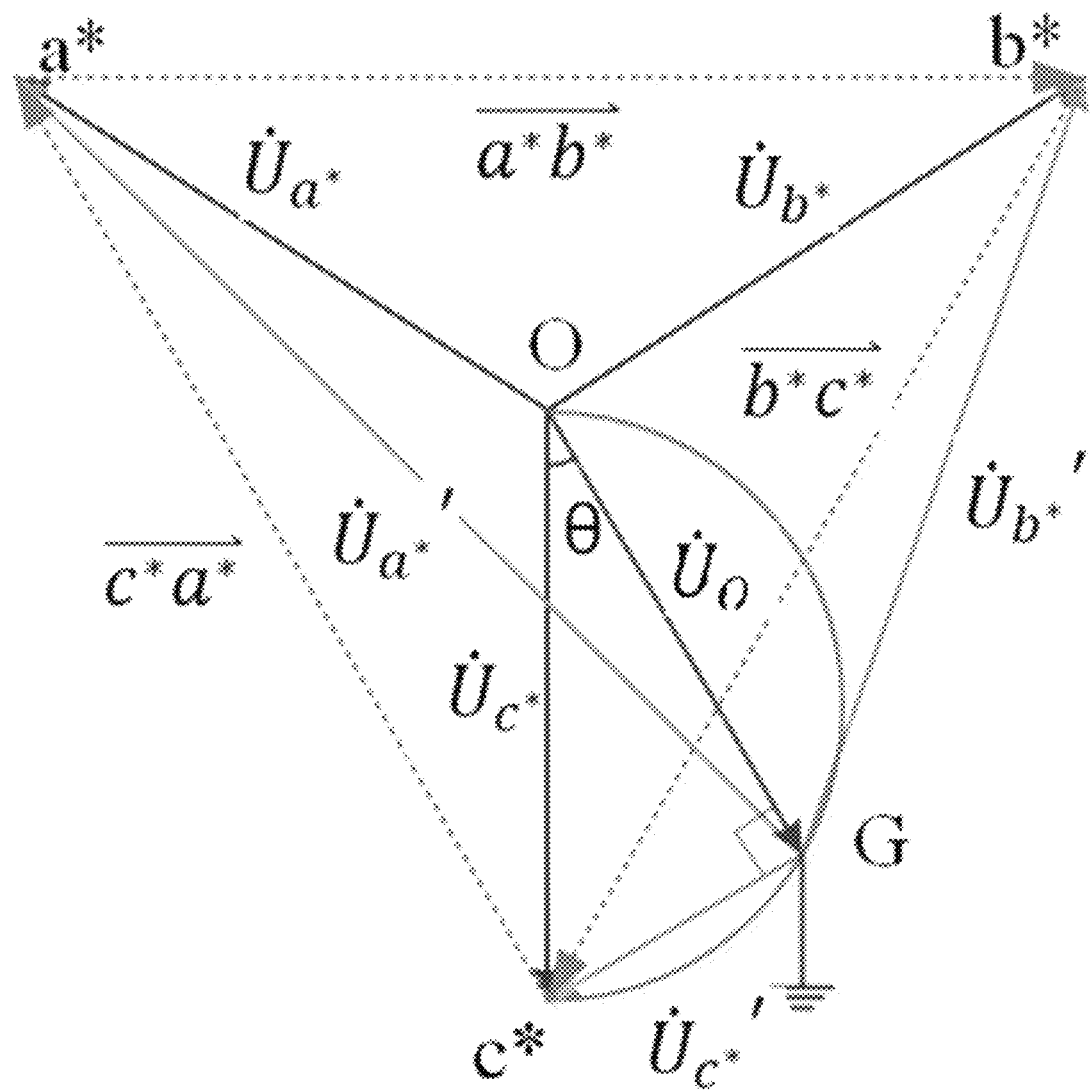
FIG. 2 is an exemplary open triangle three-phase voltage vector diagram according to the present invention.

In the present embodiment, the different situations of the voltage transformer in the power grid system include but not limited to: normal situation, single-phase metal grounding of the system, non-metallic grounding, unbalanced three-phase in the system, and the likes. The specific case includes:

It is assumed that an effective value of a port voltage of an open triangle winding that can be directly measured from the opening is $U_r$, in which its phasor is expressed as $\dot{U}_r$, and, at the same time, the voltage vector of the three-phase winding of the open triangle is shown as FIG. 2; furthermore, according to the phase sequence shown in FIG. 1, the phase sequence of the three-phase winding of the open triangle is expressed as a*, b* and c*, used to distinguish PT primary side and secondary side voltage phase sequence to facilitate vector analysis;

In this regard, the neutral point is 0; if the single-phase non-metallic grounding point on the primary side is G (in FIG. 2, the non-metallic grounding of phase C is taken as an example; if there is a metal grounding, it can be understood that point G coincides with point c*); also, $U_{a*}=U_{b*}=U_{c*}=100V/3$ is the effective value of the open triangle three-phase voltage under the normal operation, where the phasor representation corresponds to $\dot{U}_{a*}$, $\dot{U}_{b*}$ and $\dot{U}_{c*}$, which correspond to the three vector line segments starting from point O in FIG. 2 and pointing to a*, b*, c*, respectively; $U_o=U_r/3$ is the effective value of neutral point-to-ground voltage;

$$\theta = \arccos\frac{U_r}{100}$$

is the angle of the zero sequence voltage and the phase voltage of the open triangle corresponding to grounding;

Then, there are further conditions.

When the system has a single-phase ground fault, at this time, it is very similar to the characteristics of the power-frequency resonance;

Under a normal situation, there is no voltage across the opening of the open triangle. That is, $\dot{U}_r=\dot{U}_{a*}+\dot{U}_{b*}+\dot{U}_{c*}=0V$;

when the single-phase metal of the system is grounded, there is no voltage on a certain phase of the primary winding of the voltage transformer, resulting in no voltage on the corresponding phase of the corresponding PT secondary winding, and a 100V voltage appears on the open triangle. That is, $U_r=100V$;

taking FIG. 2 as an example: when the single-phase metal of the phase C is grounded, point G coincides with point c*, and $\dot{U}_o$ coincides with $\dot{U}_{c*}$. Then, $U_o=U_{c*}=100V/3$. As considering $U_o=U_r/3$, $U_r$ is 100V; it can also be understood that $\dot{U}_r$ is equal to the sum of $\overrightarrow{c*a*}$ vector and $\overrightarrow{c*b*}$ vector. That is, $\dot{U}_r=\sqrt{3}\times\sqrt{3}\dot{U}_{c*}$.

When the non-metal is grounded, in FIG. 2, the phase C is non-metallic grounding, and the point G does not coincide with point c*. That is, $\dot{U}_o$ and $\dot{U}_{c*}$ do not coincide, and the point G moves along the semicircle in FIG. 2 according to the different grounding situations. As considering that the grounding situation has occurred, the open triangle three-phase voltage at this time is shown as FIG. 2 and as $\dot{U}_{a*}'$, $\dot{U}_{b*}'$, $\dot{U}_{c*}'$ of FIG. 2 (three vector line segments starting from point G and pointing to a*, b*, c*, respectively). At this time, $\dot{U}_r=\dot{U}_{a*}'+\dot{U}_{b*}'+\dot{U}_{c*}'=3\dot{U}_o$, namely, $\dot{U}_r$ and $\dot{U}_o$ have the same phase angle (direction), in which the modulus (length) ratio is 3:1 At this condition, among the three phases of the open triangle, the effective value of the a* phase voltage is $U_{a*}'$ which is the largest, and its apparent power is also the largest, so the a* phase is the easiest overloaded. If the a* phase is guaranteed not to be overloaded, the other two phases must not be overloaded. In FIG. 2, $U_{a*}'$ can be calculated by using vector calculation combined with geometric principles, the equation is as follows:

$$U_{a*}' = \sqrt{U_o^2 + U_{a*}^2 - 2U_oU_{a*}\cos\left(120 + \arccos\frac{U_r}{100}\right)}; \quad (1)$$

considering $U_r=3U_o$, and $U_{a*}=100V/3$, there is:

$$U_{a*}' = \frac{1}{3}\sqrt{U_r^2 + 100^2 - 200U_r\cos\left(120 + \arccos\frac{U_r}{100}\right)}; \quad (2)$$

in FIG. 2, when the θ angle is 60°, $\overrightarrow{Oa*}$ is collinear with $\overrightarrow{OG}$, at this time, $U_o=U_{a*}/2$, then $U_{a*}'=50V$ and $U_r=50V$.

Next, the resistance for the harmonic elimination is $R_x$, and the open triangle current is $I_r$. Then, $I_r=U_r/R_x$; S is the rated power of each phase winding of the open triangle, and $U_m$ is the maximum value of the phase voltage in the three phases of the three windings of the open triangle. In FIG. 2, the phase C is non-metallic grounded, and the a* phase voltage in the open triangle is the largest, at this time, $U_m=U_{a*}'$. Taking $U_{Hm}$ as the maximum phase voltage of the secondary winding of the voltage transformer, according to the relationship of the winding ratio, it can be obtained that: $U_{Hm}=\sqrt{3}U_m$.

The excitation characteristics of conventional voltage transformers are designed according to 1.9 times of the phase rated voltage. This multiple ratio is represented by K. The K=1.9 of the conventional voltage transformer means that the overload capacity can reach 1.9 times of its apparent power, and the iron core will not be saturated within 1.9 times of overload. There is also an anti-saturation resonance voltage transformer whose K value can be taken up to 2.5.

In the open triangle, under the premise of not exceeding the overload, according to the power relationship, it can be obtained:

$U_mI_r \leq KS$ or $U_mU_r/R_x \leq KS$;

that is:

$$R_x \geq \frac{U_mU_r}{KS}; \quad (3)$$

considering that C is non-metallic grounded and a* phase voltage is the largest, at this time, $U_m=U_{a*}'$, and combined with equation (2), it can be obtained:

$$R_x \geq \frac{U_T}{3KS}\sqrt{U_r^2 + 100^2 - 200U_r\cos\left(120 + \arccos\frac{U_r}{100}\right)}; \quad (4)$$

in the equation, K is the multiple ratio used for designing the excitation characteristics of the voltage transformer according to the phase rated voltage;

for example, when the phase C is metallic grounded, $U_r$ is 100V and θ is 0°, the value of $R_x$ at this condition is:

$$R_{x100} = \frac{10000}{\sqrt{3}KS}.$$

Further, the cancellation of a grounding fault is also a way for exciting ferromagnetic resonance, but there must be a transition process in the middle from grounding to resonance. During this transition process, the voltage changes significantly. When the voltage change in the transition process is detected, the input of the harmonic elimination resistance must be corrected for matching before being input again.

Therefore, when the three-phase system is unbalanced, the system neutral point is drifting, and the open triangle has power-frequency voltage. In actual operation, the voltage generally does not exceed 15V. As considering that the resonance point of the power frequency resonance does not fall within the triangle of the line voltage (that is, the triangle formed by the three points a*, b*, c* in FIG. 2), the closest distance between the neutral point and the line voltage is half of the phase voltage, that is, at the angle of θ is 60°. At this condition, $U_r=3U_o=50V$, which is much greater than 15V. Therefore, the power-frequency voltage of the open triangle voltage $U_A$ less than 50V is definitely not caused by the power-frequency resonance of the voltage transformer.

Accordingly, as $U_r$ is less than or equal to 15V, either it is caused by the three-phase imbalance of the system, or it may be caused by a single-phase non-metallic ground fault, or it may be caused by resonance of high-order ferromagnetic harmonic, or frequency-division ferromagnetic resonance; if $U_r$ is greater than 15V and less than 50V, it may be caused by single-phase non-metallic ground fault, or it may be caused by resonance of high-order ferromagnetic harmonic, or frequency-division ferromagnetic resonance.

In the state where $U_r$ is less than or equal to 15V, as considering the possibility of three-phase imbalance in the system, the active harmonic elimination matching resistance needs to ensure that the three-phase winding of the open triangle is absolutely not overloaded; at this time, the condition of no overload is estimated based on the relationship between the three-phase unbalance of the system; according to the actual grid system operation result in $U_r \leq 15V$, the maximum phase voltage on the secondary winding side of the corresponding voltage transformer is:

$$U_{Hm} = \frac{\sqrt{3}}{3}(U_r + 100); \quad (5)$$

therefore, when the three-phase system is unbalanced, the value of the harmonic elimination resistance $R_x$ actively input is the minimum value $R_{x15}$, which is determined by:

$$R_{x15} = \frac{U_r(U_r + 100)}{3KS}. \quad (6)$$

Specifically, the basic prerequisite for compiling the resistance matching algorithm is: two-phase or three-phase short circuit is generally quickly removed by a microcomputer protection device in the operating system within 500 ms, so the open triangle matching resistors with any resistance value does not cause overload damage to the voltage transformer within 500 ms.

The worst case is that the two phases are short-circuited through a great resistance to the ground. Although the probability of such the situation is not high, the microcomputer protection device cannot detect the fault at this time because the short-circuit current is very small. The fault cannot be removed in time, resulting in the fault remaining for a long time. In this case, there is two-phase voltage drops due to remote short circuit and the voltage of another phase remains, in which none of the three-phase voltages rises. As considering that, in the previous resistance matching algorithm, the maximum phase voltage is used to match the resistance, so it is obvious that the voltage transformer will not be overloaded after the matching resistance is put in even if such a small probability situation occurs.

In the present embodiment, the present invention aims at the deficiencies present in the existing technologies on the market and, on the basis of active harmonic elimination, provides a PID adjustment method for automatic tracking harmonic elimination resistance of the open triangle of the voltage transformer, substantially severing as a resistance setting method for eliminating resonance of a voltage transformer of a high-voltage power grid.

In this regard, PID control, that is, proportional, integral and differential control, is one of the earliest developed control strategies. Because of its simple algorithm, good robustness and high reliability, it is widely used in industrial process control, especially for the establishment of deterministic control systems with precise mathematical models. In actual use, depending on the different characteristics of the system, PI control or PD control may be applied.

The proportional part reflects the deviation signal e(t) of the control system in proportion. Once the deviation occurs, the controller immediately takes control to reduce the deviation. When there is only proportional control, there is a steady-state error present in the system output; the integral part is mainly used to eliminate the static error and improve the error-free degree of the system. The strength of the integral action depends on the parameter adjustment effect of the PID control.

Based on the PID control strategy, the specific method for designing and constructing the harmonic elimination control system includes:

first, on the basis of active harmonic elimination, the PID control strategy is adopted, and further, according to the engineering characteristics of controlling resistance, the PI control is selected in the present invention mainly. That is, the proportional control algorithm and the integral control algorithm in the PID controller are used;

such the PID automatically adjusts the harmonic elimination resistance to run online for continuous operation throughout the entire duration, and gradually puts the harmonic elimination resistance into use through the proportional control algorithm. At the same time, the PID controls and eliminates the steady-state error in the proportional control algorithm through the integral control algorithm, so that the resonance of the voltage transformer approaches the minimum setting target value or almost none, which means it is a PID self-adaptive way for dynamically and actively inputting matching resistance for harmonic elimination.

At this condition, the data that needs to be detected or collected in real time during operation includes: voltage of the open triangle of the voltage transformer, phase voltage of three-phase of the open triangle of the voltage transformer, and loop current of the open triangle;

finally, the harmonic elimination control system for ferromagnetic resonance of the present solution is designed to track the change of the effective value $U_r$ in real time according to the cycle of 100 ms, so as to realize the dynamic adjustment of the harmonic elimination matching resistance.

In the present embodiment, the active resistance-matching strategy is described as follows.

By detecting the open voltage $U_r$, if $U_r$ is 0V, the three-phase grid system is balanced, and the resistance value of the matching input at this time has no effect on the open triangle; however, considering the actual operation of the grid, it is difficult to avoid the three-phase unbalanced situation. Then the input matching resistance value is calculated according to equation (6), taking $U_r$=5V for calculation, that is, the input resistance value is $$R_{x5} = \frac{U_r(U_r + 100)}{3KS}.$$

Further, if $U_r$ changes, adjustment is performed according to the following strategies:

Strategy 1:

when $U_r$ is less than or equal to 15V, according to the statistical results in the table shown in FIG. 3, the factor of $U_r$ may be caused by load imbalance, single-phase ground fault, or even high-order harmonic in ferromagnetic resonance or frequency division ferromagnetic resonance. At this condition, the harmonic elimination control system of the present invention, according to equation (6), dynamically calculates the matching resistance value according to 100 ms period.

If $U_r$ is caused by a single-phase grounding fault in the system or a three-phase imbalance in the system, under the condition that $U_r$ is less than or equal to 15V, the harmonic elimination control system keeps dynamically calculating the matching resistance according to equation (6) until the fault is eliminated. If the voltage transformer is in the non-power frequency ferromagnetic resonance state, the energy will be released quickly until the resonance energy disappears. After the resonant energy is released, or after troubleshooting, when $U_r$ is less than or equal to 5V, resistance $R_{x5}$ is input.

Strategy 2:
  when $U_r$ is greater than 15V and less than or equal to 100V, according to the statistical results in the table shown in FIG. 3, the factor of $U_r$ change is caused by many reasons, which can be roughly divided into two categories. One of the categories is that it is caused by ferromagnetic resonance, in which, when it is less than or equal to 50V, the ferromagnetic resonance can only be non-power frequency ferromagnetic resonance, and when it is greater than 50V, both non-power frequency ferromagnetic resonance and power frequency ferromagnetic resonance are possible factors. Another one of the categories is that it is caused by various faults represented by single-phase non-metallic grounding. In such case, the harmonic elimination control system of the present invention, according to the equation (4), dynamically calculates the matching resistance value according to 100 ms period.

If $U_r$ is caused by the various faults of the system, under the condition that $U_r$ is greater than 15V and less than 100V, the harmonic elimination control system keeps dynamically calculating the matching resistance according to equation (4) until the fault is eliminated. If the voltage transformer is in the ferromagnetic resonance state of power frequency, the energy will be released quickly until the resonance energy disappears. After the resonant energy is released, or after troubleshooting, when $U_r$ is less than or equal to 15V, it can be handled according to strategy 1.

Strategy 3:
  when $U_r$ is greater than 100V, it is considered that $U_r$ is beyond the calculation range of equation (4) and that the overload pressure of each phase winding of the open triangle is much larger than the conditions described in strategy 1 and strategy 2. Referring to the table in FIG. 3, when the two phase values of the power frequency in ferromagnetic resonance increase, $U_r$ will become to be greater than 100V. At this situation, the resonance elimination control system of the present invention performs matching resonant resistor with twice the resistance of $R_{x100}$. At the same time, the matched resonant resistor may have a bit large resistance, but it can ensure that each phase of the open triangle will not be overloaded. At this situation, the resonance elimination control system dynamically tracks the value of $U_r$. With the release of resonance energy, the value of $U_r$ can eventually be less than 100V, then going to the strategy 2.

Figure 4:
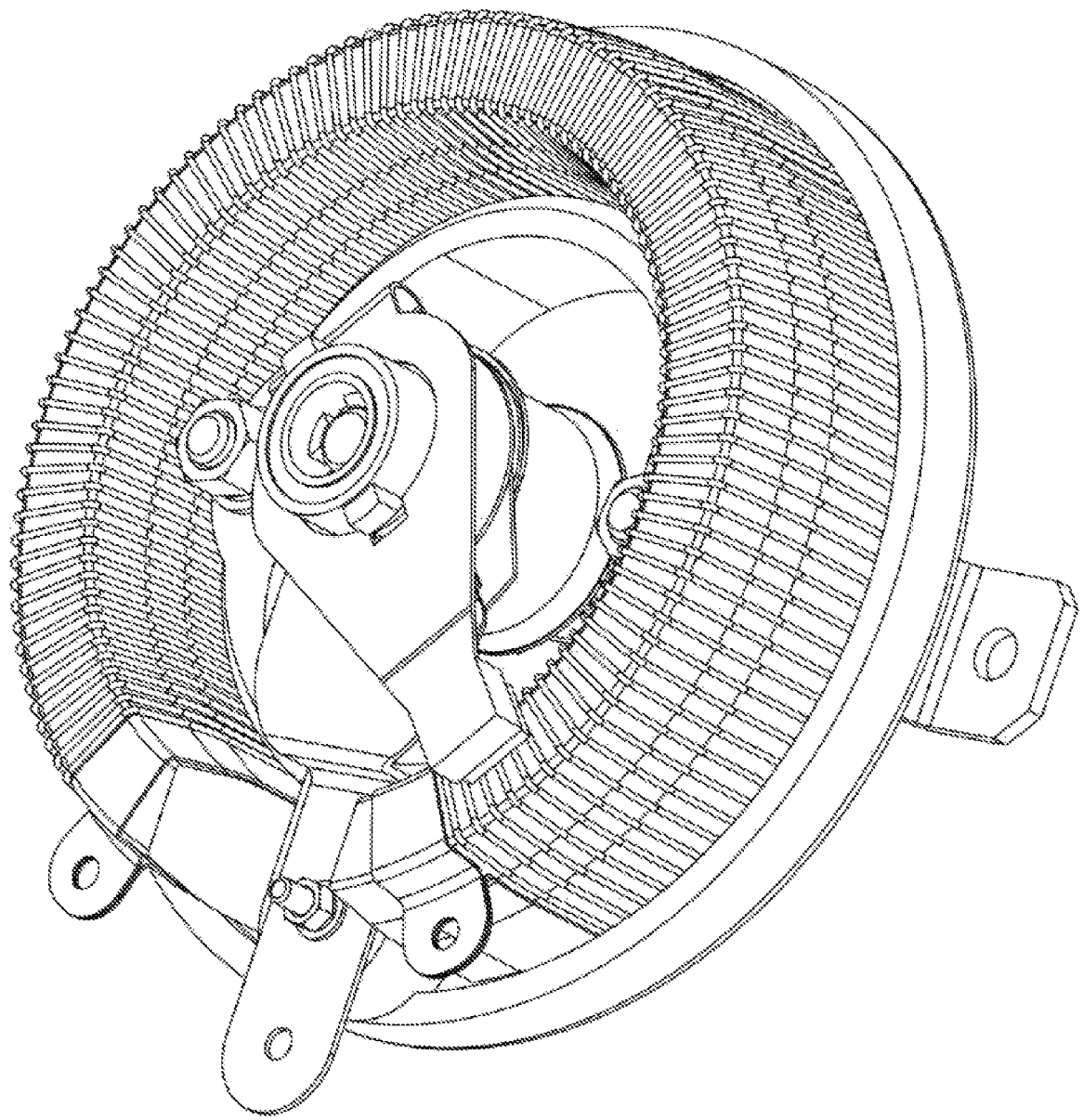
FIG. 4 is an exemplary outline drawing of a high-power load ceramic disk disc with an adjustable sliding rheostat according to the present invention.
Figure 5:
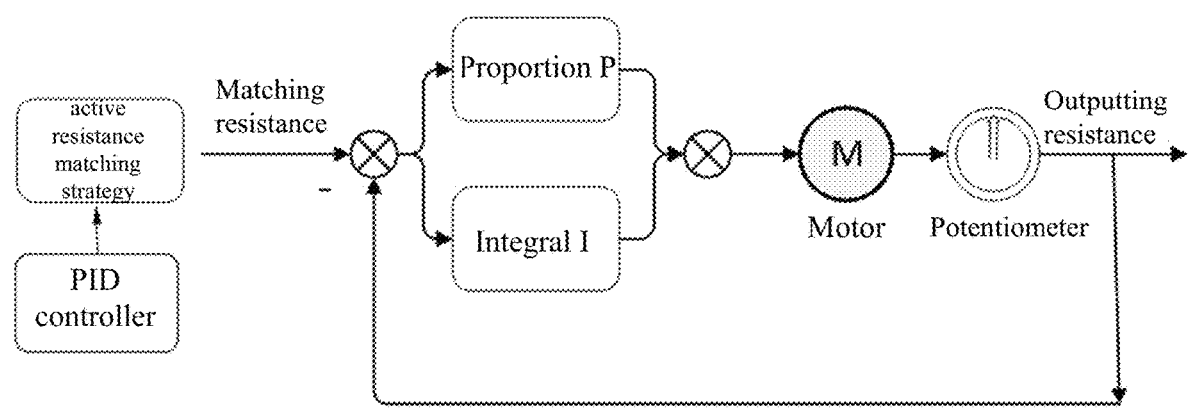
FIG. 5 is an exemplary control structure diagram of an engineering scheme for adjusting a sliding rheostat for inputting resistance through motor driving according to the present invention.

In addition, as shown in FIGS. 4 to 5, in order to avoid the occurrence of system resonance which is easy to occur during fault recovery, the present solution also provides a reliable engineering solution for placing resistors, mainly as follows:
  the input resistor is achieved by choosing an adjustable sliding rheostat with a high-power load porcelain disc, and its appearance is shown in FIG. 4. The power is converted according to the S value and the K value of the open triangle of the voltage transformer and according to the resistance value put in when the opening voltage is 100V. Generally, the selected power P is not less than $2.5 \times 10000/R_{x100}$. The maximum resistance value is not less than 2.5 times $R_{x100}$.

The actuator can adopt a DC brushed geared motor, in which its power only needs to meet the driving requirements. Through the connection between the output shaft of the reducer and the rotating shaft of the sliding rheostat, the DC motor is driven through the PI algorithm controlling to drive the sliding rheostat to rotate to the resistance value which can match the resistor. The control structure of this engineering scheme is shown in FIG. 5.

Through experiments, by the proposed method, it can solve the contradiction between the standards of the harmonic elimination resistance and the winding overload in the open triangle of the voltage transformer when the single-phase ground fault occurs and the fault is eliminated; and it can well avoid the technical difficulties that the characteristics of single-phase ground fault and power frequency resonance are difficult to distinguish and the resonance caused by single-phase ground fault.

By the proposed method, the mainly purpose is to ensure that the PT is not overloaded and burned. Accordingly, the actual implementation strategy is to put in the corresponding resistance around the voltage transformer PT (voltage transformer) not being overloaded. The PID process only needs to pay attention to the voltage and current on the open triangle winding. Based on this requirement, a more intelligent harmonic elimination method can be adopted by the present method. That is, the rated power of the PT is used as the target value of the PID, and the resistance value of the input is dynamically adjusted to adjust the winding current of the open triangle. As such, the open triangle winding is not overloaded, and the purpose of harmonic elimination can be achieved at the fastest speed. This strategy can also replace the above-mentioned active resistor-matching strategy.

Figure 6:
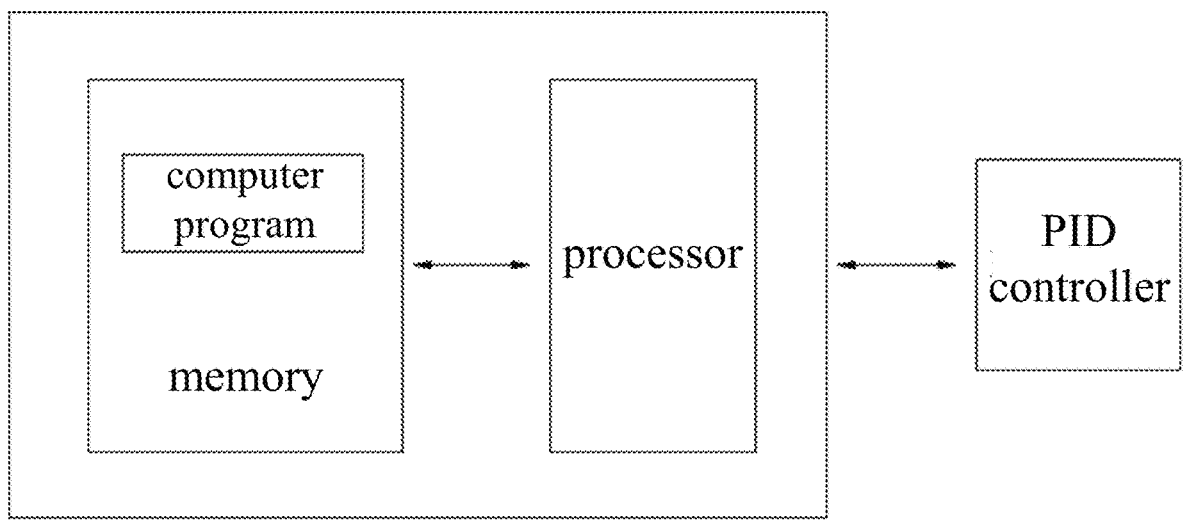
FIG. 6 is an exemplary structural diagram of a platform device of an electronic computer according to the present invention.

As shown in FIG. 6, the present embodiment further provides a method operating platform device, including a processor, a memory, a computer program stored in the memory and running on the processor, and an external PID controller.

The processor includes one or more processing cores. The processor is connected to the memory through bus, and the memory is configured to store program instructions. The processor is configured to execute the computer program, realizing the above-mentioned harmonic elimination method for ferromagnetic resonance for an active resistance-matching voltage transformer based on PID-adjustment.

Optionally, the memory can be implemented by any type of volatile or non-volatile memory device or their combinations, such as static anytime access memory (SRAM), electrically erasable programmable read-only memory (EEPROM), erase programmable read-only memory (EPROM), programmable read-only memory (PROM), read-only memory (ROM), magnetic memory, flash memory, magnetic disk or optical disk.

Moreover, the present invention is to provide a computer-readable storage medium. The computer-readable storage medium stores a computer program. When the computer program is executed by a processor, it realizes the steps of the above-mentioned harmonic elimination method for ferromagnetic resonance for an active resistance-matching voltage transformer based on PID-adjustment.

Those of ordinary skill in the art can understand that the process of realizing all or part of the steps of the above-mentioned embodiments can be completed by hardware, and can also be completed by instructing related hardware through a program, and the program can be stored in a computer-readable storage medium. The storage medium as mentioned can be read-only memory, magnetic disk, or optical disk and so on.

The basic principles, main features and advantages of the present invention have been shown and described above. Those skilled in the art should understand that the present invention is not limited by the above-mentioned embodiments. Those described in the above-mentioned embodiments and description are only preferred examples of the present invention, and are not intended to limit the present invention, without departing from the spirit and scope of the present invention. Under the premise, the present invention will have various changes and improvements, and these changes and improvements all fall within the scope of the claimed invention. The protection scope of the present invention is defined by the appended claims and their equivalents.

What is claimed is:

1. A harmonic elimination method for ferromagnetic resonance for an active resistance-matching voltage transformer based on PID-adjustment, comprising:

S1, compiling a resistance matching algorithm: analysing voltage amplitude and phase sequence of a voltage transformer in different situations of a power grid system, so as to obtain corresponding resistance matching algorithms, respectively, wherein a specific approach for S1 comprises:

assuming that an effective value of a port voltage of an open triangle winding that is directly measured from an opening is $U_r$, wherein phasor thereof is expressed as $\dot{U}_r$ and phase sequence of three-phase winding of the open triangle is expressed as a*, b* and c*, used to distinguish PT primary side and secondary side voltage phase sequence to facilitate vector analysis;

wherein, a neutral point is 0, wherein $U_{a*}=U_{b*}=U_{c*}=100V/3$ is an effective value of three-phase voltage of the open triangle under a normal operation, where phasor representation corresponds to $\dot{U}_{a*}$, $\dot{U}_{b*}$ and $\dot{U}_{c*}$; wherein $U_o=U_r/3$ is an effective value of the neutral point-to-ground voltage, called zero-sequence voltage, and with phasor represents $\dot{U}_o$; wherein θ=arc cos $U_r/100$ is an angle of the zero sequence voltage and the phase voltage of the open triangle corresponding to grounding;

wherein the further conditions comprise:

when a single-phase ground fault in a system, under a normal situation, no voltage across the opening of the open triangle, as $\dot{U}_r=\dot{U}_{a*}+\dot{U}_{b*}+\dot{U}_{c*}=0V$;

when a single-phase metal in the system is grounded, no voltage on a certain phase of a primary winding of the voltage transformer, resulting in no voltage on a corresponding phase of a corresponding PT secondary winding, wherein a 100V voltage appears on the open triangle, as $U_r=100V$;

wherein, when non-metal grounding, it is assumed that among three phases of the open triangle, an effective value of the a* phase voltage is $U_{a*}'$ which is the largest, and its apparent power is also the largest, so the a* phase is the easiest overloaded; if the a* phase is guaranteed not to be overloaded, the other two phases must not be overloaded;

S2, designing and building a harmonic elimination control system based on a PID control strategy, wherein a specific approach for S2 comprises:

first, on a basis of active harmonic elimination, adopting the PID control strategy and further according to engineering characteristics of controlling resistance selecting and adopting a PI controlling such that a proportional control algorithm and an integral control algorithm in a PID controller are used;

wherein, next, a PID automatically adjusts harmonic elimination resistance to run online for continuous operation throughout an entire duration, and gradually puts the harmonic elimination resistance into use through the proportional control algorithm, wherein, at the same time, the PID controls and eliminates a steady-state error in the proportional control algorithm through the integral control algorithm, so that resonance of the voltage transformer approaches a minimum setting target value or almost none, which means preventing ferromagnetic resonance of the voltage transformer is in an active way;

wherein, at the same time, data that needs to be detected or collected in real time during operation includes: voltage of the open triangle of the voltage transformer, phase voltage of three-phase of the open triangle of the voltage transformer, and loop current of the open triangle;

wherein, finally, the harmonic elimination control system is designed to track change of the effective value $U_r$ of an open triangle port voltage in real time according to a cycle of 100 ms, so as to realize dynamic adjustment of harmonic elimination matching resistance;

S3, using the above-mentioned harmonic elimination control system, according to different conditions of voltage, presetting an active resistance-matching strategy, and executing the strategy to realize dynamic adjustment of the harmonic elimination matching resistance, comprising:

first of all, detecting an open voltage $U_r$, wherein if $U_r$ is 0V, a three-phase grid system is balanced, and a resistance value of a matching input at this time has no effect on the open triangle, wherein, as considering an actual operation of the grid, it is difficult to avoid a three-phase unbalanced situation, and then an matching resistance value is input according to equation $$R_{x15} = \frac{U_r(U_r + 100)}{3KS},$$

where $R_{x15}$ in the equation is a minimum value of a harmonic elimination resistance $R_x$, and wherein if $U_r$ changes, adjustment is made according to strategies as follows:

strategy 1:

wherein when $U_r$ is less than or equal to 15V, first, it is determined if a factor of $U_r$ change is caused by any one of load imbalance, single-phase ground fault, high-order harmonic in ferromagnetic resonance, and frequency division ferromagnetic resonance, and then through the harmonic elimination control system according to the equation of $$R_{x15} = \frac{U_r(U_r + 100)}{3KS},$$

where $R_{x15}$ is a minimum value of a harmonic elimination resistance $R_x$, dynamic calculation is performed until a fault is eliminated or resonance energy disappears;

strategy 2:

wherein when $U_r$ is greater than 15V and less than or equal to 100V, first, it is determined if $U_r$ change is caused by ferromagnetic resonance or various faults represented by single-phase non-metallic grounding, and then using the harmonic elimination control system according to equation of $$R_x \geq \frac{U_T}{3KS}\sqrt{U_r^2 + 100^2 - 200U_r\cos\left(120 + \arccos\frac{U_r}{100}\right)},$$

where K is a multiple ratio used for designing excitation characteristics of the voltage transformer according to a phase rated voltage, dynamically calculation is performed for a resistance value of a matching resistor until a fault is eliminated or resonance energy disappears; wherein after the resonance energy is released, or after the fault is eliminated, when $U_r$ is less than or equal to 15V, it is handled according to the strategy 1;

strategy 3:

wherein when $U_r$ is greater than 100V, first, matching resonant resistor is performed with twice resistance of $R_{x100}$ through the resonance elimination control system, and, at the same time, the resonance elimination control system dynamically tracks a value of $U_r$, wherein with release of resonance energy, the value of $U_r$ eventually is less than 100V, then going to the strategy 2;

S4, designing an engineering scheme for placing resistors in order to avoid ferromagnetic resonance when a system failure is recovered.

2. The harmonic elimination method for ferromagnetic resonance for an active resistance-matching voltage transformer based on PID-adjustment of claim 1, wherein, in the step of S1, the different situations of the voltage transformer in the power grid system comprise: normal situation, single-phase metal grounding of a system, non-metallic grounding, and unbalanced three-phase in a system.

3. The harmonic elimination method for ferromagnetic resonance for an active resistance-matching voltage transformer based on PID-adjustment of claim 1, wherein when non-metal is grounded, $U_{a*}'$ is calculated by using vector calculation combined with geometric principles, wherein equation is as follows:

$$U_{a*}' = \sqrt{U_o^2 + U_{a*}^2 - 2U_oU_{a*}\cos\left(120 + \arccos\frac{U_r}{100}\right)}; \tag{1}$$

wherein as considering $U_r = 3U_o$, and $U_{a*} = 100V/3$, there is:

$$U_{a*}' = \frac{1}{3}\sqrt{U_r^2 + 100^2 - 200U_r\cos\left(120 + \arccos\frac{U_r}{100}\right)}; \tag{2}$$

wherein, furthermore, resistance for the harmonic elimination is $R_x$, and an open triangle current is $I_r$, and $I_r = U_r/R_x$, wherein S is a rated power of each phase winding of the open triangle, and $U_m$ is a maximum value of a phase voltage in three phases of three windings of the open triangle;

wherein $U_{IIm}$ is taken as a maximum phase voltage of a secondary winding of the voltage transformer, according to a relationship of a winding ratio, it is obtained that:

$$U_{IIm} = \sqrt{3}U_m;$$

wherein in the open triangle, under premise of not exceeding the overload, according to a power relationship, it is obtained:

$$U_mI_r \leq KS \text{ or } U_mU_r/R_x \leq KS;$$

wherein, that is:

$$R_x \geq \frac{U_mU_r}{KS}; \tag{3}$$

wherein, as considering that when a* phase voltage is the largest, at this time, $U_m = U_{a*}'$, and as combined with equation (2), it is obtained:

$$R_x \geq \frac{U_T}{3KS}\sqrt{U_r^2 + 100^2 - 200U_r\cos\left(120 + \arccos\frac{U_r}{100}\right)}; \tag{4}$$

wherein, K is the multiple ratio used for designing excitation characteristics of the voltage transformer according to a phase rated voltage.

4. The harmonic elimination method for ferromagnetic resonance for an active resistance-matching voltage transformer based on PID-adjustment of claim 1, wherein in the step of S1, in a process of compiling the resistance matching algorithm, cancellation of a grounding fault is also a way for exciting ferromagnetic resonance, but there must be a transition process in the middle from grounding to resonance, wherein during this transition process, the voltage changes significantly, wherein when a voltage change in the transition process is detected, input of the harmonic elimination resistance must be corrected for matching before being input again, wherein, therefore, when a three-phase system is unbalanced, a system neutral point is drifting, and the open triangle has power-frequency voltage, wherein, in actual operation, the voltage generally does not exceed 15V;

wherein, then, in a state where $U_r$ is less than or equal to 15V, as considering possibility of three-phase imbalance in a system, the active harmonic elimination matching resistance needs to ensure that a three-phase winding of the open triangle is absolutely not overloaded, wherein, at this time, a condition of no overload is estimated based on a relationship between the three-phase unbalance of a system;

wherein, according to an actual grid system operation result in $U_r \leq 15V$, a corresponding maximum phase voltage on a secondary winding side of the voltage transformer is:

$$U_{IIm} = \frac{\sqrt{3}}{3}(U_r + 100); \tag{5}$$

wherein, when a three-phase system is unbalanced, a value of the harmonic elimination resistance $R_x$ actively input is a minimum value $R_{x15}$, which is determined by:

$$R_{x15} = \frac{U_r(U_r + 100)}{3KS}. \tag{6}$$

5. The harmonic elimination method for ferromagnetic resonance for an active resistance-matching voltage transformer based on PID-adjustment of claim 1, wherein, in the step of S1, a basic prerequisite for compiling the resistance matching algorithm is that: two-phase or three-phase short circuit is generally quickly removed by a microcomputer protection device in an operating system within 500 ms, so the open triangle matching resistors with any resistance value does not cause overload damage to the voltage transformer within 500 ms.

6. The harmonic elimination method for ferromagnetic resonance for an active resistance-matching voltage transformer based on PID-adjustment of claim 1, wherein, in the step of S4, the engineering scheme for placing resistors mainly comprises that the input resistor is achieved by choosing an adjustable sliding rheostat with a high-power load porcelain disc, and wherein, at the same time, an actuator adopts a DC brushed geared motor, in which its power only needs to meet driving requirements.

\* \* \* \* \*